July 10, 1934.        J. H. SAMPSON        1,966,138
AUTOMOBILE BRAKE
Filed June 19, 1930
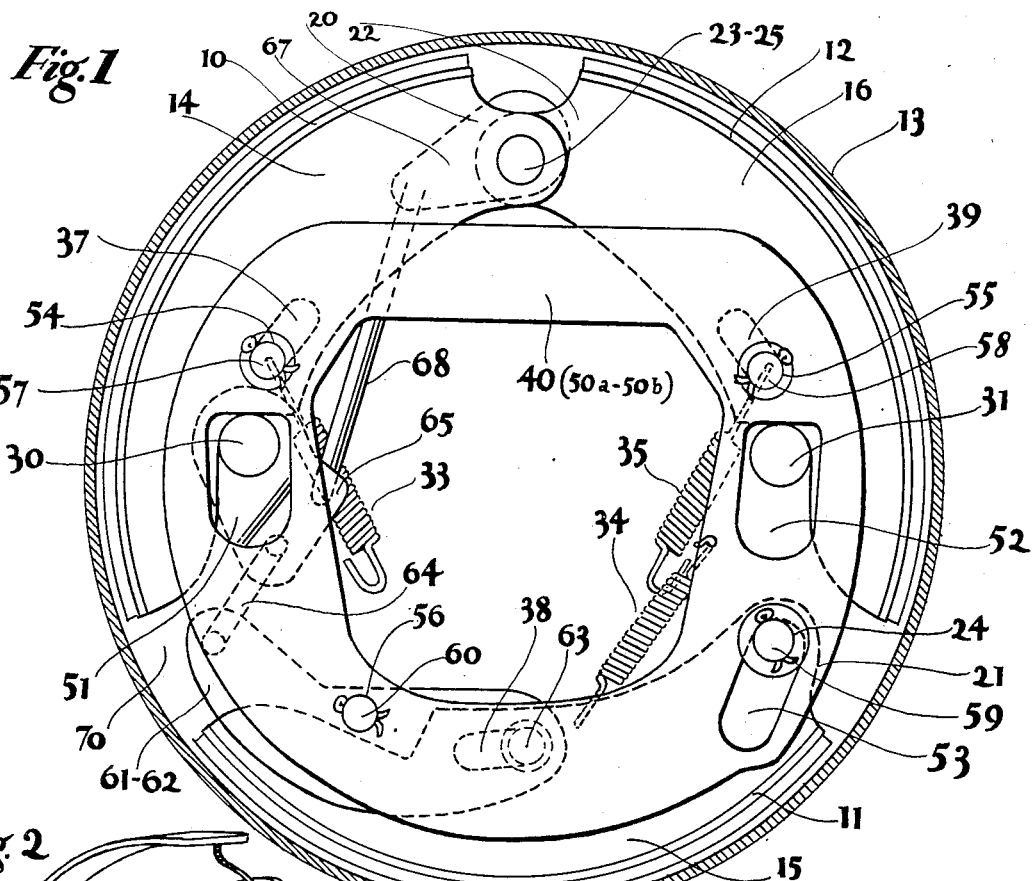
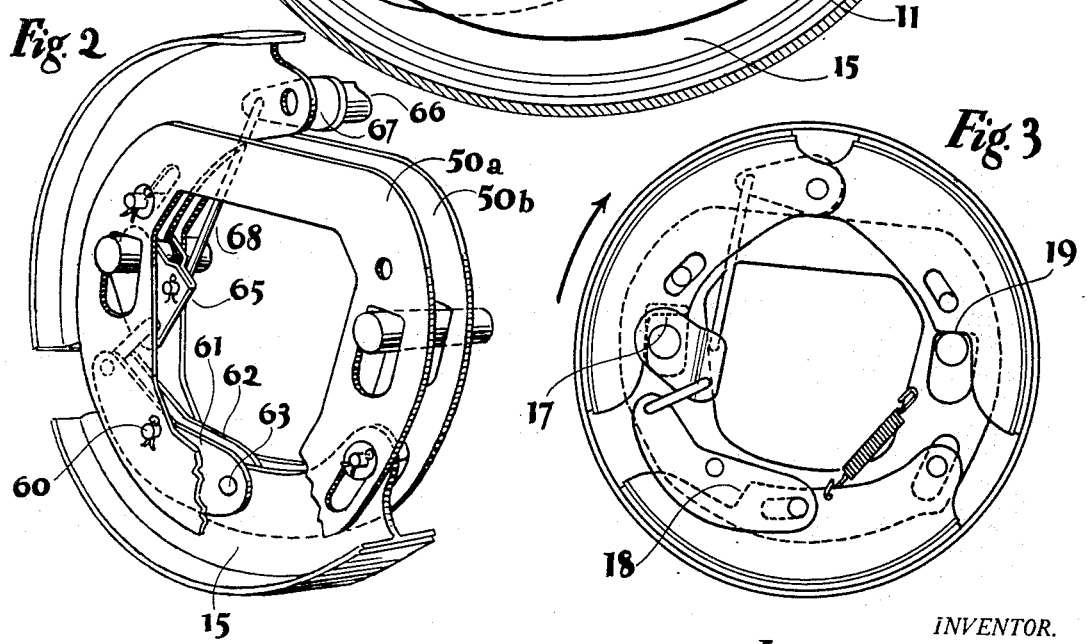
INVENTOR.
John H. Sampson
BY
ATTORNEY.

Patented July 10, 1934

1,966,138

UNITED STATES PATENT OFFICE 1,966,138

AUTOMOBILE BRAKE

John H. Sampson, Chicago, Ill., assignor to Bendix Brake Company, Chicago, Ill., a corporation of Illinois Application June 19, 1930, Serial No. 462,165

16 Claims. (Cl. 188—78)

The present invention relates to a brake suitable particularly for automobiles and other vehicles, although its application is by no means limited to such purposes.

An object of the present invention is to provide a brake that is self-energizing. By self-energizing, it is meant that, when an operating force is placed upon the brake, the motion of the vehicle itself is imparted through various instrumentalities to the brake parts and will tend to further energize the brake, enlarging the impelling force whereby to accelerate the force of the braking energy.

Another object of the invention is to provide a new and improved combination of braking elements whereby high efficiency is obtained.

A third object of the invention generally stated, is the provision of a new and unique braking means.

These objects, and such other objects as may hereinafter appear, are obtained by the novel construction, unique arrangement, and the improved combination of the several elements which constitute the invention, one form of which is illustrated in the accompanying drawing, hereby made a part of this specification, and in which:

Figure 1 is a plan view of a brake assembly embodying the invention;

Figure 2 is a perspective view of the brake shown in Figure 1 with various parts removed; and Figure 3 is a reduced plan view showing the effect of an impelling force upon the brake.

Like reference characters are used to designate similar parts in the drawing and in the description of the invention which follows.

The several figures may be read jointly for convenience.

In the present form of the invention, there are three identical brake shoes, 10, 11, and 12, each of which is less, but only slightly less, than one-third of the circumference of a brake drum 13 in which it is used. Each shoe has a web 14, 15 and 16 which is shaped with a stepdown 17, 18, and 19 in the radial part thereof and about one-third its length from the end.

The other end of each shoe web has an extension 20, 21, and 22 thereon, and in each projection is an aperture 23, 24, and 25.

Each of the shoes 10, 11, and 12 may be provided with the usual facing, which may be an arcuate section of metal, or of other material, and this facing is adapted, upon expansion of the brake members, to quickly engage the inside of the brake drum 13 or a lining therein, the brake drum 13 shown being adapted to be lined in a conventional fashion.

In each of said shoes, the step down 17, 18 and 19 therein is for the purpose of riding upon a bearing surface against an anchor bolt and thus prevent the rotation of a shoe, or any of them, with the drum.

Two of the shoes 10 and 12 are suitably hinged or otherwise connected together through the apertures 23 and 25 in their ends. Said shoes 10 and 12 are placed in the upper part of the drum and, when combined, form slightly more than a semi-circular unit. Each of the steps 17 and 19 on the ends of these shoes rests upon anchor bolts, 30 and 31, or a similar projection from a backing plate. The anchors 30 and 31 are so placed and positioned that they will give to said shoes 10 and 12 a proper clearance between the shoes 10 and 12 and the drum 13 when the shoes are both at a position of rest. Springs 33 and 35 are provided to hold said shoes 10 and 12 away from the drum 13, and firmly against the anchors 30 and 32. In fact, the webs of the shoes are held in impinging relation in respect to said anchors.

Each shoe 10, 11, and 12 is provided with an elongated slot 37, 38, and 39 near the inner edge of its radial web, 14, 15 and 16, respectively, one limit of the slot 37, 38 and 39 being practically the center of the shoe 10, 11, and 12 lengthwise of such shoe, the slot extending toward the step end of the shoe. This end of the slots 37, 38 and 39 is farther from the axis of the brake drum than the other end of said slots.

Within the brake drum 13 and comprising the central portion of the brake and wholly within the faces of said shoes 10, 11, and 12 is a rigid ring-like member 40 which may be made from metal stampings or of other suitable construction, said member generally comprising two members spaced apart and arranged for conjoint movement as a single unit and having two large elongated openings 51 and 52, which fit over and rest about the anchor bolts 30 and 31.

The radial web 14, 15 and 16 of each shoe 10, 11, and 12 is placed between these two ring-like members, 50a and 50b, one being on one side of the web and the other at the opposite side thereof. Apertures 54 and 55 are provided through the rings 50a and 50b at a point directly opposite the lower ends of the slots 37 and 39 in the shoe webs 14 and 16. Bolts 57 and 58 pass through these apertures, 54 and 55, and 37 and 39, one in each slot. Said bolts 57 and 58 hold the rings 50a and 50b together and cause them to form a structure in the nature of a truss or bridge across the two upper shoes 10 and 12. When these through bolts 57 and 58 rest in the lower end of the shoe slots 37 and 39, the shoes 10 and 12 are in contracted position, and are free from contact with the drum 13.

The third shoe 11 is placed in a position in the bottom of the drum 13, which allows an open space between the ends of shoe 11 and the adjacent ends of the two other shoes 10 and 12 which comprise the upper portion of the braking unit.

In the drawing, when looking toward the backing plate 70 and assuming the forward rotation of the drum 13 to be clockwise, the aperture (24) end of the shoe 11 is placed at the right.

Here another wide slot 53 is provided in the two rings 50a and 50b through which a bolt 59 passes therethrough to allow the third shoe 11 to move downwardly and to the left. In the contracted position of the shoe, the bolt 59 through this end (24) bears against the upper limit of the slot 53.

On the left side of the ring member, the aperture 56 is provided just above the step end of the radial web. The bolt 60 through this serves as the fulcrum for a walking beam lever made up of two light stampings 61 and 62 straddling the shoe web 15. The right hand end of the walking beam 61—62 has a bearing bolt or rivet 63 through the slot 38 in the lower shoe 11, and at the end near the center of the web 15. The other end of the walking beam lever 61—62 receives a pull through a link 64 pivoted to a compensating crank 65 which moves about the left anchor bolt 30 as an anchor. The purpose of the compensating crank 65 is to maintain constant length between the source of the pull and the end of the lower lever.

Such pull may be upon the basis of a journalled shaft 66 in the brake drum 13 and its side walls, said shaft 65 having a lever (not shown) or other means connected by a link (not shown) or in some other suitable manner to an operating lever, not shown, as, for example, a brake pedal. Within the drum or housing 13, said shaft 66 has a lever 67 to which is connected a link 68, the link 68 depending downwardly therefrom as is shown in Figures 1 and 2, to connect lever 67 with compensating crank 65.

Movement of the shaft 66 thus pulls on the walking beam lever 61—62 forcing the right end, (connected to the shoe 11 by means of the bolt 63 through the slot 38) downward and likewise the lower shoe 11. When the shoe 11 comes into contact with the drum 13, the pull on the walking beam lever 61—62 then acts through the fulcrum 60 and moves the left side of the ring member 50a and 50b upwardly and clockwise, the ring member bolt 58 through the shoe slot 39 in shoe 12 becoming the axis of this rotation of the ring member. Such movement forces shoes 10 and 12 outwardly because of the movement of the bolt 57 along the angle of the shoe slot 37 which in turn forces the bolt 58 to move outwardly against the lower end of the slot 39. This combination of forces and movements causes all three shoes 10, 11 and 12 to bear against the drum 13. The lower shoe 11 is not anchored to the backing plate and consequently when coming in contact with the revolving drum 13, it imparts the force of its tendency to rotate through the walking beam lever 61—62 to the ring member 50a and 50b. That force of rotation brings about an added clockwise movement of the ring member 50a and 50b, forcing the upper shoes 10 and 12 outward, due to the camming action of the bolts 57 and 58 in the shoe slot 37 and 39. This action is illustrated in Figure 3.

When the braking force is removed, the springs 33 and 35 are adapted to draw the upper shoes 10 and 12, and concurrently the lower shoe 11, from contact with the braking drum 13, the lower shoe 11 being released directly because of the release of the impelling force thereupon and because of the spring 34 attached thereto and to the ring member, while the upper shoes 10 and 12 are positively drawn away from contact by the urging force of said spring members 33 and 35, aided by the natural force of gravity operating upon the upper shoes 10—12 and the ring member.

The purpose of the compensating lever 65 is to provide an equal primary actuating force upon the three brake shoes regardless of the direction of the rotation of the brake drum or direction of vehicular movement. Experiment discloses that if the source of the pull comes from a point directly opposite the linked end of the walking beam lever 61—62, movement of the walking beam lever 61—62 in either direction will not change its distance from this imaginary point as its axis. For obvious reasons, such a construction is impracticable, so that the structure here shown has been devised in place of the ideal arrangement.

For this purpose a short lever, herein referred to as the compensating lever 65, has been adopted.

By mounting the lever 65 so that it pivots on the anchor 30 and constructing the lever 65 itself of a relatively small compass, it has been possible to attach thereto a link 64 extending to the walking beam lever 61—62 to give to the latter movement along substantially the same path as it would follow were the pull thereon from the ideal source, namely, the imaginary source just mentioned.

It may be said that the present mechanical arrangement is the equivalent of a device having the ideal source of pull, and for all practical purposes, the present device behaves in the same manner as though the pull on walking beam lever 61—62 originates from such point source. As disclosed in the drawing and in the description herein given, it is manifest that the walking beam lever 61—62 swings in an arc about its connection with the compensating lever 65 rather than relatively to the actual source of the pull. Thus, when the vehicle is traveling in reverse, and an actuating force is applied, the rotation of the wheels will be effective to accelerate the braking force. The present arrangement of parts compensates for the shifting of the pull end by the actuating lever which shifting would otherwise have a tendency to draw the linked end of the walking beam lever away from the drum, and the construction of such parts maintains the end of the walking beam lever 61—62 substantially equidistant from the ideal point source of pull at all times, not allowing it to shift with the change in the position of the actual source of pull.

I claim:

1. Brake construction comprising a drum, a member rotatable relatively to said drum and having a plurality of camming surfaces, shoes engaged intermediate their ends by said camming surfaces, and moved by the rotation of said member, an additional shoe, and means for concurrently actuating said additional shoe and rotatable member.

2. Brake construction comprising a drum, a member rotatable relatively to said drum and having a plurality of camming surfaces, shoes engaged by said camming surfaces, and actuated by the rotation of said member, an additional shoe, a lever having a camming surface engaging said additional shoe, and means for conjointly moving said rotatable member and lever.

3. Brake construction comprising a drum, a member rotatable relatively to said drum and having a plurality of camming surfaces, shoes engaged intermediate their ends by said camming surfaces, and actuated by the movement of said member, an additional shoe, a lever having a camming surface engaging said additional shoe and secured to said rotatable member, and means for moving said lever.

4. Brake construction comprising a drum, a member rotatable relatively to said drum and having a plurality of camming surfaces, shoes engaged by said camming surfaces intermediate their ends, an additional shoe, a lever having a camming surface engaging said additional shoe and secured to said rotatable member, and means for moving said lever in a path corresponding to a path of movement obtainable by pivoting said lever at a point in said drum directly opposite its movable end.

5. Brake construction comprising a drum, a member rotatable relatively to said drum and having a plurality of camming surfaces, an anchoring member for said member, shoes engaged by said camming surfaces, an additional shoe, a lever having a camming surface engaging said additional shoe, a lever rotatable about said anchoring member and adapted to be actuated when braking action is desired, and a link intermediate said rotatable lever and said camming lever.

6. Brake construction comprising a drum, a member rotatable relatively to said drum and having a plurality of camming surfaces, an anchoring member for said member, and in respect to which it is relatively movable, shoes engaged by said camming surfaces, an additional shoe, a lever having a camming surface engaging said additional shoe, and pivoted in said rotatable member, a lever rotatable about said anchoring member and adapted to be actuated when braking action is desired, and a link intermediate said rotatable lever and said camming lever.

7. Brake construction comprising a drum, a member rotatable relatively to said drum and having a plurality of camming surfaces, an anchoring member for said member, and in respect to which it is relatively movable, shoes engaged by said camming surfaces, an additional shoe, a lever having a camming surface engaging said additional shoe, and pivoted in said rotatable member, a lever rotatable about said anchoring member, and a link disposed intermediate said rotatable lever and camming lever whereby movement is imparted to said camming lever along a path substantially identical with a path which said lever would follow if pivoted at its end to the opposite side of said drum.

8. Braking means comprising a drum, a plurality of brake shoes therein two of which are connected and arranged both to anchor on one shoe when the drum is turning in one direction and to anchor on the other shoe when the drum is turning in the other direction, actuating means for certain of said shoes, and actuating means for another of said shoes connected independently of the shoe to the first actuating means.

9. A brake drum, brake shoes therein, one means for moving a portion of said shoes for braking effect, another means for moving the remainder of said shoes for the same effect, and a connection independent of said shoes from one of said means to the other whereby a rotating force applied to said shoes tends to expand the shoes circumferentially to boost their braking effect, one of said shoes being mounted to be movable circumferentially with the drum and acting through said connection to intensify the braking action of the other shoes.

10. A brake system comprising a drum, movable paired bridges therein, bolt members for said drum forming anchors for said bridge members, shoes mounted in said bridges and movable relatively thereto, a walking beam lever pivoted in said bridge member and connected to one of said shoes for movement relative thereto, a lever rotatable at one of said anchors for imparting movement to said walking beam lever, and a lever intermediate said levers whereby to impart substantially straight line movement to said walking beam lever.

11. A brake comprising a drum, a plurality of shoes arranged for co-operation therewith, and all of which are arranged inside the drum, actuating means for certain of the shoes, actuating means for another of the shoes, and means for expanding all of the shoes concomitantly by turning said first means about the axis of the drum and rocking said second means to force said other shoe against the drum.

12. A brake comprising a drum, a plurality of shoes arranged for co-operation therewith, and all of which are arranged inside the drum, actuating means for certain of the shoes, actuating means for another of the shoes, and interconnected actuating means tending to boost the braking effect.

13. A brake comprising a pair of connected shoes shiftably arranged to anchor alternatively on one or the other of the shoes, a third shoe arranged between the unconnected ends of the pair of shoes, applying means for the connected shoes, and an applying device acting on said applying means and on said third shoe.

14. A brake comprising floating friction means shiftably arranged to anchor alternatively at one or the other of the other of two points adjacent its opposite ends, a servo shoe arranged between the ends of the friction means, applying means for the friction means and an applying device acting on said applying means and on said shoe.

15. A brake comprising a plurality of shoes, connected rigid ring-shaped members on opposite sides of and having applying means acting on some of said shoes, and an applying device acting on the applying means and on another of said shoes.

16. A brake comprising a plurality of shoes, connected rigid ring-shaped members on opposite sides of and having parts acting as applying cams for at least some of said shoes, and an applying device for moving said members to apply the shoes.

JOHN H. SAMPSON.